(12) United States Patent
Tan et al.

(10) Patent No.: US 11,187,182 B1
(45) Date of Patent: Nov. 30, 2021

(54) CYLINDER HEAD AND GAS ENGINE

(71) Applicant: WEICHAI POWER CO., LTD., Shandong (CN)

(72) Inventors: Xuguang Tan, Shandong (CN); Dehui Tong, Shandong (CN); Shun Lv, Shandong (CN); Wei Li, Shandong (CN); Shaodong Zhang, Shandong (CN); Xiaolei Fu, Shandong (CN)

(73) Assignee: WEICHAI POWER CO., LTD., Weifang (CN)

( * ) Notice: Subject to any disclaimer, the term of this patent is extended or adjusted under 35 U.S.C. 154(b) by 0 days.

(21) Appl. No.: 17/220,874

(22) Filed: Apr. 1, 2021

(30) Foreign Application Priority Data

May 13, 2020 (CN) .......................... 202010399992.5

(51) Int. Cl.
*F02F 1/42* (2006.01)

(52) U.S. Cl.
CPC .................. *F02F 1/4235* (2013.01)

(58) Field of Classification Search
CPC ... F02F 1/4235; F01L 3/06; F02D 2041/0015; F02B 31/04; F02B 2023/106; F02B 2275/48; F02B 2023/108
USPC ...................................................... 123/193.5
See application file for complete search history.

(56) References Cited

U.S. PATENT DOCUMENTS

| 3,045,655 | A | * | 7/1962 | Formia | F02F 1/4285 |
| | | | | | 123/308 |
| 4,438,740 | A | * | 3/1984 | Slee | F02F 1/4235 |
| | | | | | 123/188.8 |
| 5,836,284 | A | * | 11/1998 | Oda | F02F 1/4214 |
| | | | | | 123/308 |
| 6,431,140 | B1 | * | 8/2002 | Nishimura | F02B 31/00 |
| | | | | | 123/306 |
| 9,797,336 | B2 | * | 10/2017 | Nakahara | F02F 1/4235 |
| 2016/0281633 | A1 | | 9/2016 | Nakahara et al. | |
| 2017/0058823 | A1 | | 3/2017 | Hayman et al. | |
| 2017/0175670 | A1 | | 6/2017 | Nishimura | |

FOREIGN PATENT DOCUMENTS

| CN | 105464784 A | 4/2016 |
| CN | 106014602 A | 10/2016 |
| CN | 106481476 A | 3/2017 |
| CN | 106884733 A | 6/2017 |
| CN | 210483874 U | 5/2020 |
| CN | 210509417 U | 5/2020 |

* cited by examiner

*Primary Examiner* — Long T Tran
*Assistant Examiner* — James J Kim
(74) *Attorney, Agent, or Firm* — Fenwick & West LLP

(57) ABSTRACT

A cylinder head includes an intake throat and an intake duct, a valve seat ring is provided in an inner ring of the intake throat; a section of the intake duct is a tumble generating duct; and an extending direction of the tumble generating duct is oblique relative to the cylinder head bottom surface, the lower side surface of the tumble generating duct is a tumble guide surface, the lower end of which forms a tumble generating sharp angle, and the projection of the tumble generating sharp angle on the upper end circular surface of the valve seat ring is a sharp angle projection, the sharp angle projection is a protruding area protruding from the edge of the upper end circular surface of the valve seat ring, and the width of the middle part of the sharp angle projection is larger than the width of both ends thereof.

12 Claims, 7 Drawing Sheets

US 11,187,182 B1

CYLINDER HEAD AND GAS ENGINE

CROSS REFERENCE TO RELATED APPLICATIONS

This application claims priority to Chinese patent application No. 202010399992.5, titled "CYLINDER HEAD AND GAS ENGINE", filed with the China National Intellectual Property Administration on May 13, 2020, the entire disclosure of which is hereby incorporated by reference.

FIELD

The present application relates to the technical field of engines, and in particular to a cylinder head and a gas engine.

BACKGROUND

With the development of gas engine technology, more and more engine manufacturers are developing and designing gas engines based on diesel engines. Because of the particularity of the combustion mode of diesel engine, the intake duct in the cylinder head of the engine is required to organize the airflow to generate sufficient vortex during the intake process. The intake flow pattern of the conventional diesel engine cylinder head is shown in FIG. 1. The intake airflow enters the intake duct 02 along the intake direction 04, and then enters the cylinder 01 through the intake throat. Because the intake duct 02 is a tangential and spiral air intake duct, the direction of intake air is consistent with the direction of vortex generation, so it is very beneficial for the intake air to generate vortex in the cylinder 01, and the moving direction of the vortex is shown in a vortex schematic 03 in FIG. 1.

The gas engine, however, does not need excessive vortex but needs to organize tumble flow. The gas engine may only achieve the goal of optimizing combustion by effectively generating tumble flow. Vortex refers to the organized swirling movement of gas around the cylinder axis, and tumble refers to the swirling movement where the central axis of rotation and the central axis of the cylinder liner are perpendicular.

Therefore, how to facilitate the generation of the tumble flow required by the gas engine through structural design on the basis of the existing diesel engine is a technical problem that needs to be addressed by those skilled in the art.

SUMMARY

In view of this, the present application is to provide a cylinder head for changing the structure of the intake duct in the cylinder head on the basis of the existing diesel engine, so that the gas entering the cylinder generates the tumble effect required by the gas engine. The present application is further to provide a gas engine including the above cylinder head.

Technical solutions are provided as follows according to the present application.

A cylinder head includes an intake throat and an intake duct, a valve seat ring is provided in an inner ring of the intake throat; a section, close to the intake throat, of the intake duct is a tumble generating duct; and the extending direction of the tumble generating duct is oblique relative to the cylinder head bottom surface, the lower side surface of the tumble generating duct is a tumble guide surface, and the lower end of the tumble guide surface forms a tumble generating sharp angle located above the valve seat ring, and the projection of the tumble generating sharp angle on the upper end circular surface of the valve seat ring along the axial direction of the intake throat is a sharp angle projection, the sharp angle projection is a protruding area protruding from the edge of the upper end circular surface of the valve seat ring to the center of the intake valve in the radial direction, and the width of the middle part of the sharp angle projection is larger than the width of both ends thereof.

Preferably, the sharp angle projection is a crescent-shaped area with the concave side facing the center of the intake valve.

Preferably, the tumble generating sharp angle includes an upper guiding surface and a lower processing surface, where the lower processing surface is a rotary processing surface surrounding a processing axis, the processing axis and the axis of the valve seat ring are coincided, parallel or relatively inclined, and the generatrix of the rotary processing surface is a straight line, a broken line or a curve.

Preferably, the rotary processing surface is a conical processing surface, the processing axis of the conical processing surface coincides with the axis of the valve seat ring, and the vertex of the conical processing surface is located above the valve seat ring.

Preferably, the conical angle of the conical processing surface is 60 degrees-160 degrees.

Preferably, the maximum flow port formed by the rotary processing surface on the upper end circular surface of the valve seat ring is a theoretical intake flow port, and an equivalent diameter of the theoretical intake flow port is 85%-100% of the minimum diameter of the sealing surface of the valve seat ring.

Preferably, an area of the sharp angle projection is 15%-50% of an area of the theoretical intake flow port.

Preferably, the connecting line between the midpoint of the connecting line, between the two ends of the sharp angle projection, and the center of the intake valve is a sharp angle direction line, and an included angle between the connecting line, between the center of the intake valve and the center of the exhaust valve, and the sharp angle direction line is a sharp angle direction angle ranging from 0 to 45 degrees.

Preferably, an arc angle spanned by the sharp angle projection on the upper end circular surface of the valve seat ring is 90 degrees-220 degrees.

Preferably, the tumble guide surface is provided with a flowing-down guide surface which is located upstream of the tumble generating sharp angle and is recessed toward the cylinder head bottom surface.

Preferably, the intake duct includes a straight duct, a curved transition duct and the tumble generating duct which are sequentially communicated along the intake direction, the curved transition duct is extended from the straight duct to the tumble generating duct, and the maximum distance from the lower side of the curved transition duct to the cylinder head bottom surface is more than 0.25 times the diameter of the cylinder liner.

The working principle of the present application is as follows: when the engine cylinder inhales, the intake valve is opened, and when the intake airflow in the intake duct passes through the tumble generating duct, the intake direction is inclined relative to the cylinder head bottom surface and directed into the intake throat. When the intake airflow is injected into the intake throat, some airflow is squeezed towards the exhaust valve due to the tumble generating sharp angle, thus increasing the airflow toward the exhaust valve side and decreasing the airflow on the intake side. The airflow on both sides forms a large-scale tumble movement after entering the cylinder, thus meeting the combustion demand of the gas engine.

Therefore, on the basis of the existing diesel engine, the present application designs the tumble generating duct 5 downstream of the intake duct and the tumble generating sharp angle at the lower end of the tumble generating duct, so that the intake air flow may generate the tumble effect required by the gas engine; meanwhile, only the intake duct structure of the cylinder head of the existing diesel engine needs to be modified according to the present application, which greatly reduces the cost of product modification and design and improves the feasibility of the product.

In addition, at the end of the compression stroke of the engine, the tumble flow in the cylinder is crushed into small-scale turbulence, which makes the gas generate higher turbulent kinetic energy, thus increasing the speed of flame propagation, meeting the combustion demand of the gas engine and improving the thermal efficiency of the gas engine.

The present application further provides a gas engine including the above cylinder head. The beneficial effects produced by the gas engine is substantially similar to the derivation process of the beneficial effects brought about by the cylinder head described above, so it may not be repeated here.

BRIEF DESCRIPTION OF THE DRAWINGS

To illustrate technical solutions according to the embodiments of the present application or in the conventional technology more clearly, the drawings to be used in the description of the conventional technology or the embodiments are described briefly hereinafter. Apparently, the drawings described hereinafter are only some embodiments of the present application, and other drawings may be obtained by those skilled in the art based on those drawings without any creative effort.

Figure (FIG. 1 is a schematic diagram of an intake air flow in a cylinder head of a conventional diesel engine.

Figure 1:
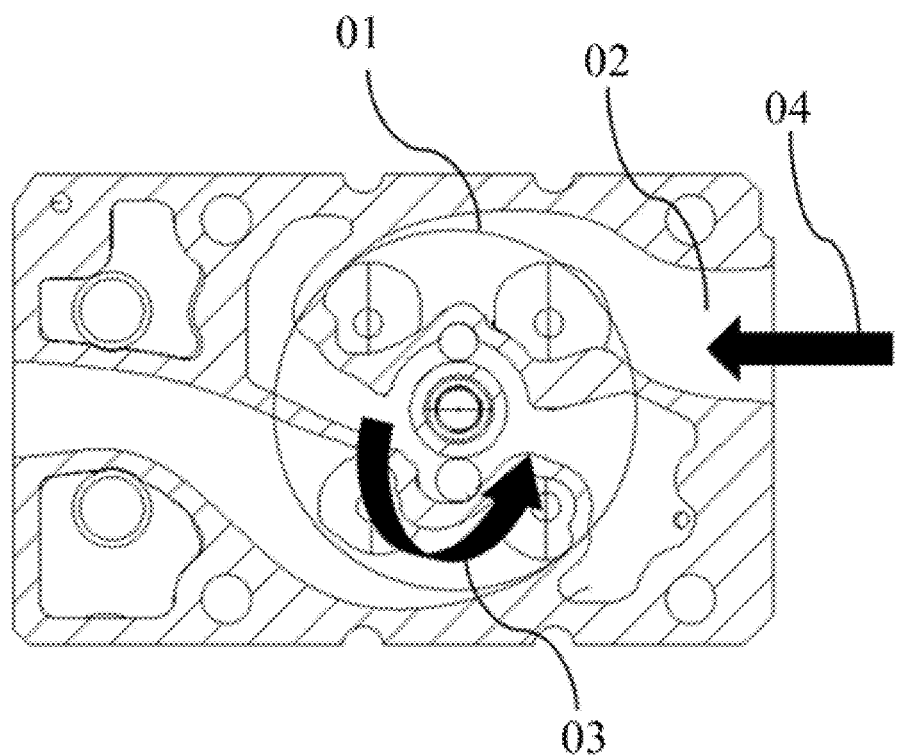

Reference numerals in FIG. 1 are as follows:
01 cylinder;
02 intake duct;
03 vortex schematic;
04 intake direction;
Reference numerals in FIGS. 2 to 8 are as follows:
1 cylinder head main body;
2 intake duct;
3 cylinder head bottom surface;
4 valve seat ring;
5 round surface at upper end of valve seat ring;
6 intake valve guide duct;
7 rotary processing surface, rotary processing feature in the cylinder head processing process, where this feature removes part of the material of the cylinder head main body 1 to form a tumble generating sharp angle 9;
8 intake throat;
9 tumble generating sharp angle, the protruding structure formed by the tumble guide surface 22 and the rotary processing surface 7 for generating tumble flow during the air intake process;
10 exhaust throat;
11 exhaust valve center;
12 connecting line between intake valve center and exhaust valve center;
13 sharp angle direction line: the connecting line between the midpoint of the connecting line, between the two ends of the sharp angle projection, and the center of the intake valve;
14 connecting line between the two ends of the sharp angle projection;
15 sharp angle projection: the projection of the tumble generating sharp angle 9 along the axial direction of the intake throat 8 in the round surface at upper end of valve seat ring 5;
16 theoretical intake flow port, where its equivalent diameter is D2 and its total area is S3;
21 tumble generating duct;
22 tumble guide surface, lower side of tumble generating duct 21;
23 flowing-down guide surface;
100 tumble schematic.

DETAILED DESCRIPTION

Technical solutions of embodiments of the present application are clearly and completely described hereinafter in conjunction with the drawings of the embodiments of the present application. Apparently, the embodiments described in the following are only some embodiments of the present application, rather than all embodiments. Based on the embodiments of the present disclosure, all of other embodiments, made by those skilled in the art without any creative efforts, fall into the scope of protection of the present disclosure.

Figure 2:
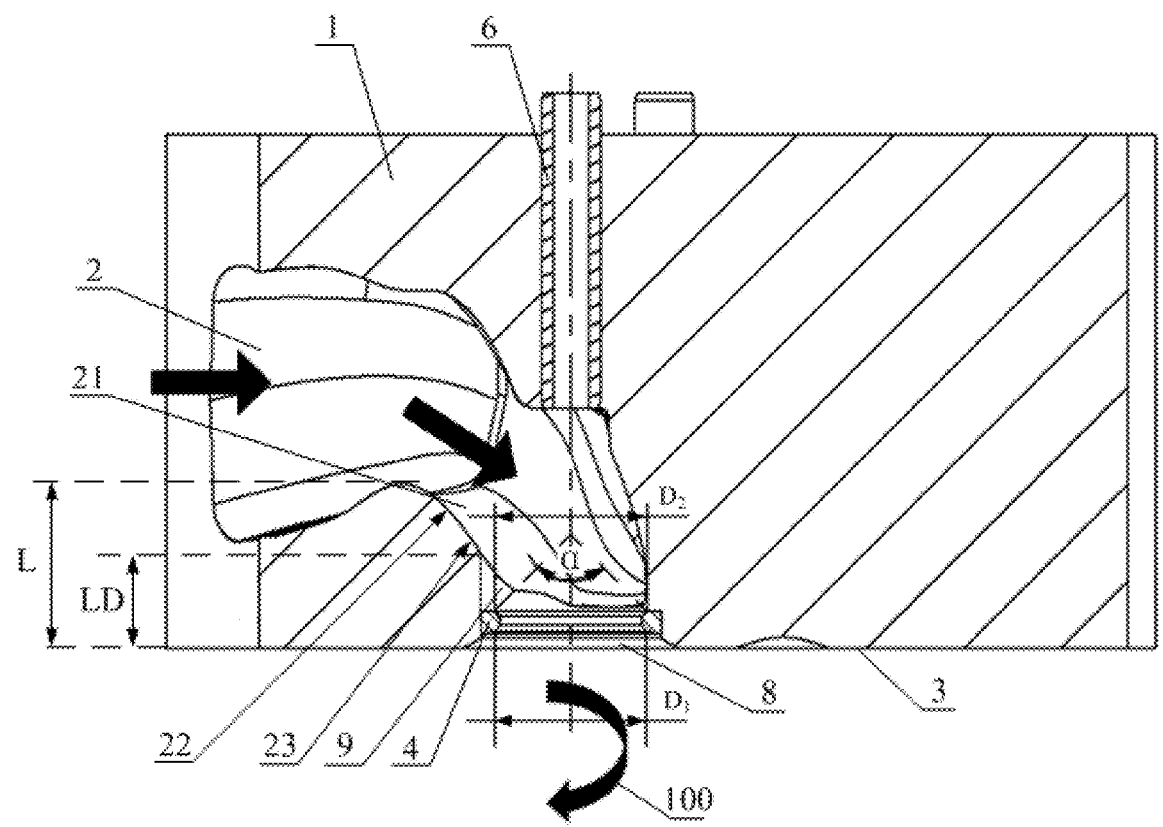
FIG. 2 is a longitudinal sectional view of a cylinder head in a specific embodiment of the present application.
Figure 3:
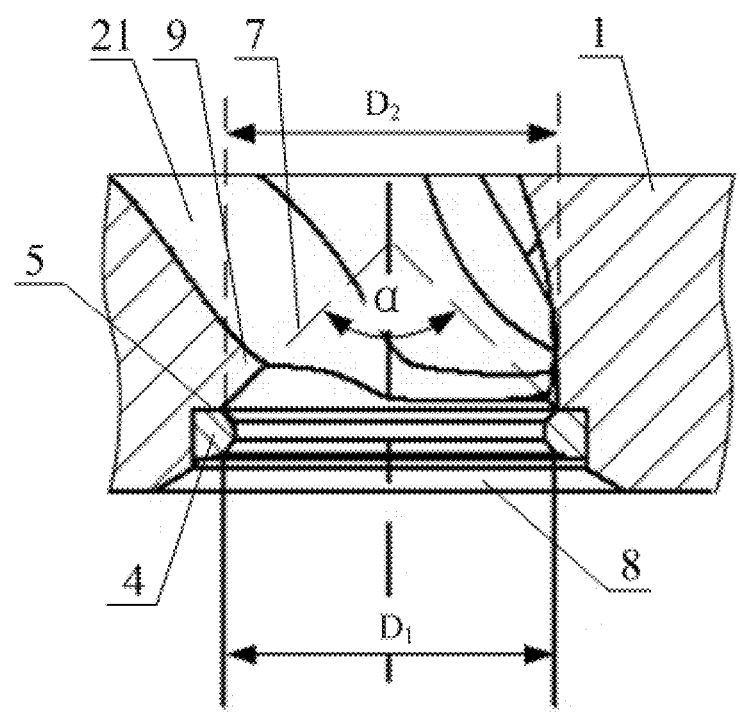
FIG. 3 is a partial enlarged view of a tumble generating sharp angle in an intake duct in the specific embodiment of the present application.
Figure 4:
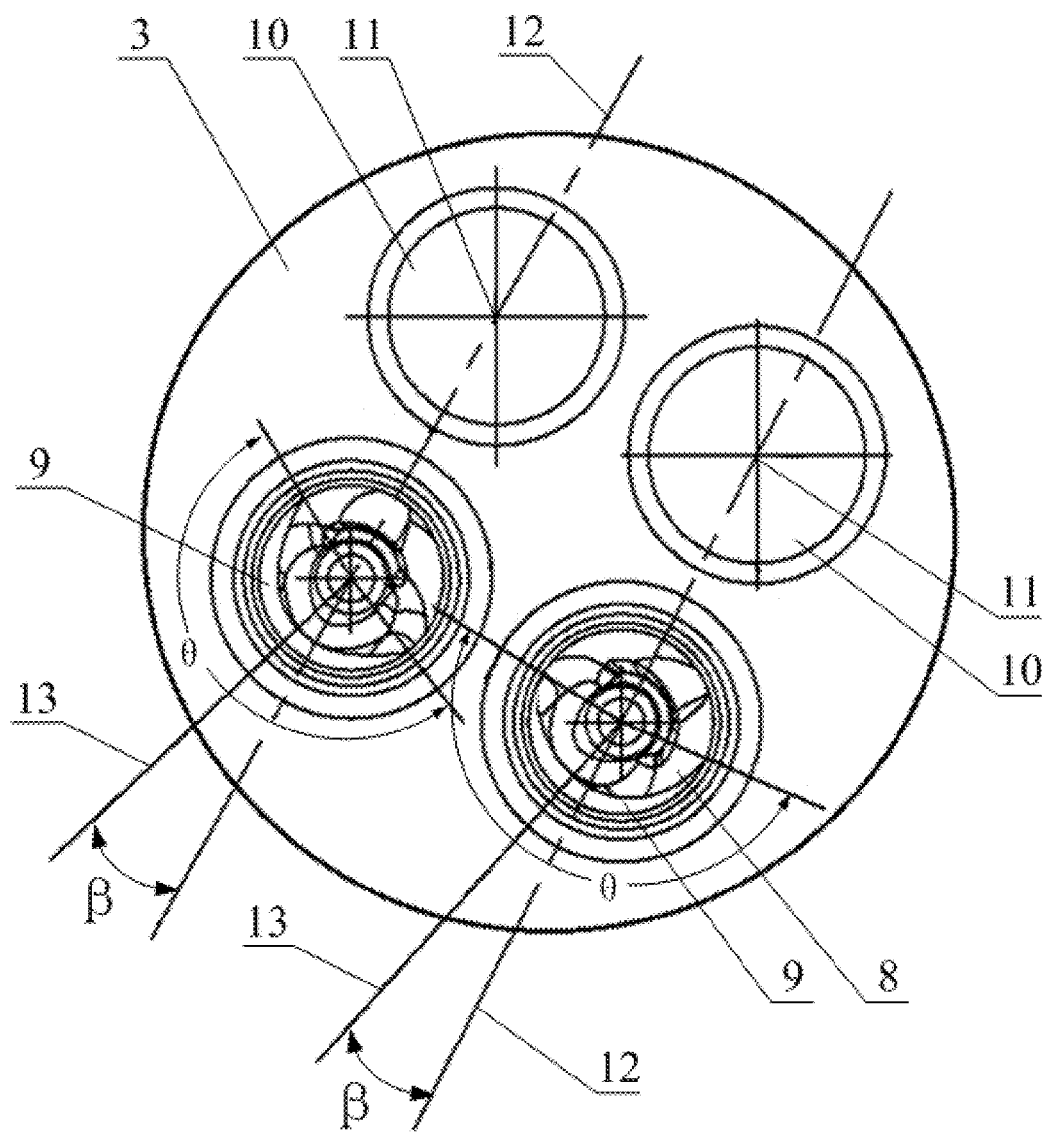
FIG. 4 is a bottom view of a cylinder head bottom surface in the specific embodiment of the present application.
Figure 5:
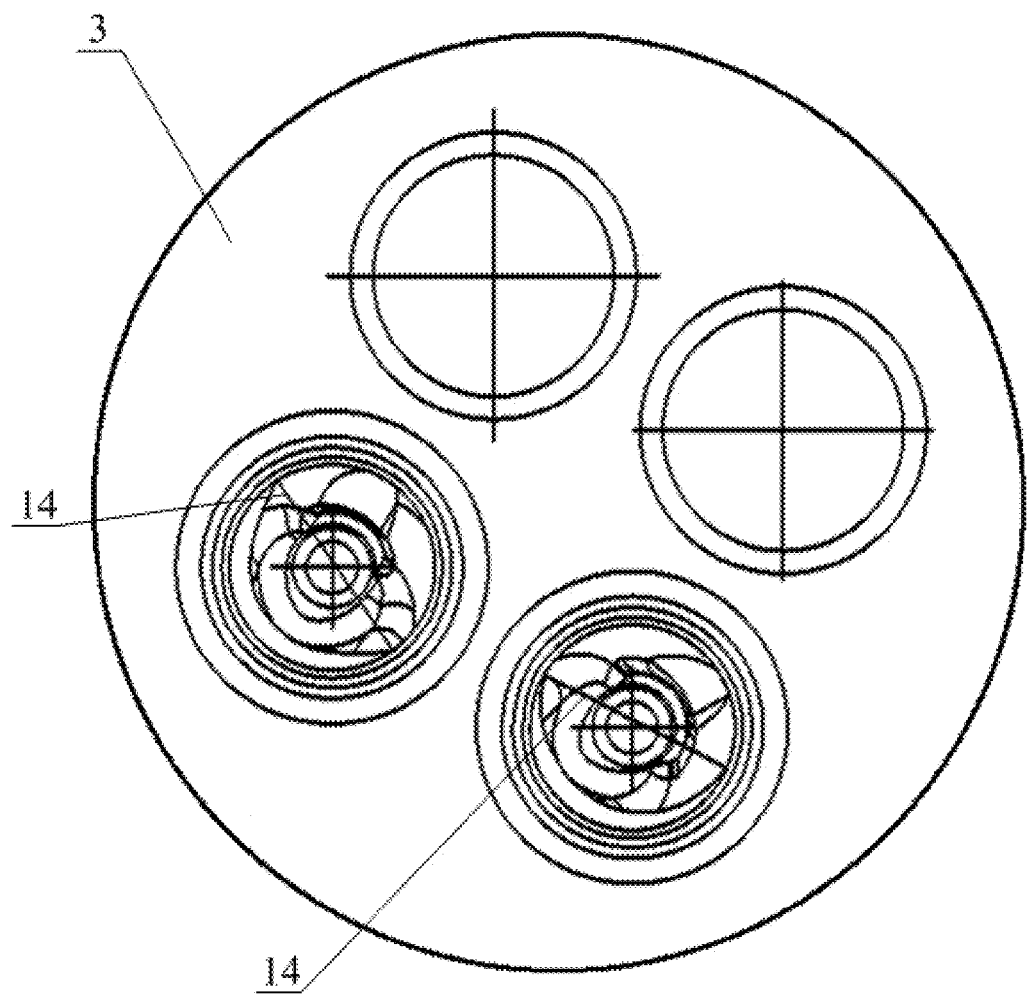
FIG. 5 is a schematic diagram of the position of a connecting line between two ends of an sharp angle projection in an intake throat in the specific embodiment of the present application.
Figure 6:
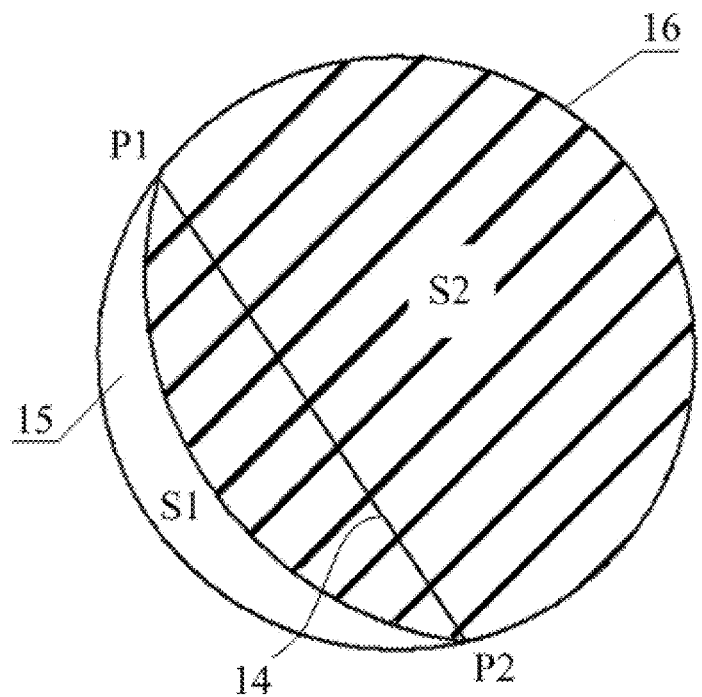
FIG. 6 is a schematic diagram of the position of a sharp angle projection in a theoretical intake flow port in the specific embodiment of the present application.

Referring to FIG. 2 to FIG. 6, FIG. 2 is a longitudinal sectional view of a cylinder head in a specific embodiment of the present application; FIG. 3 is a partial enlarged view of a tumble generating sharp angle in an intake duct in a specific embodiment of the present application; FIG. 4 is a bottom view of a cylinder head bottom surface in a specific embodiment of the present application; FIG. 5 is a schematic diagram of the position of the connecting line between the two ends of the sharp angle projection in the intake throat in the specific embodiment of the present application; FIG. 6 is a schematic diagram of the position of the sharp angle projection in the theoretical intake flow port in the specific embodiment of the present application.

The present application provides a cylinder head. A cylinder head main body 1 includes an intake throat 8 and an intake duct 2, and a valve seat ring 4 is provided in an inner ring of the intake throat 8. A section, close to the intake throat 8, of the intake duct 2 is a tumble generating duct 21; and an extending direction of the tumble generating duct 21 is oblique relative to a cylinder head bottom surface 3, a lower side surface of the tumble generating duct 21 is a tumble guide surface 22, and a lower end of the tumble guide surface 22 forms a tumble generating sharp angle 9 located above the valve seat ring 4. The projection of the tumble generating sharp angle 9 on an upper end circular surface of the valve seat ring 4 along an axial direction of the intake throat 8 is defined as a sharp angle projection 15, and the sharp angle projection 15 is a protruding area protruding to the center of the intake valve from the edge of the upper end circular surface of the valve seat ring 4 in the radial direction. In this specification, the upper circular surface of the valve seat ring 4 is a round surface at an upper end of valve seat ring 5 in FIG. 3, and the center of the intake valve coincides with the center of the round surface at upper end of valve seat ring 5. The width of the middle of the sharp angle projection 15 is greater than the width of its two ends, that is, the radial dimension of the middle part of the sharp angle projection 15 in the upper circular surface of the valve seat ring 4 is larger than the radial dimension of both ends of the sharp angle projection 15 in the upper circular surface of the valve seat ring 4.

In addition, the cylinder head provided by the present application further includes two exhaust valves, two exhaust throats 10 and two exhaust ducts, and the arrangement positions of the exhaust throats 10 and the exhaust valve centers 11 are shown in FIG. 4. The intake valve is mounted in the intake valve guide duct 6 and mounted with the valve seat ring 4 of the intake throat 8 to realize air intake.

The working principle of the present application is as follows: when the engine cylinder inhales, the intake valve is opened, and when the intake airflow in the intake duct 2 passes through the tumble generating duct 21, the intake direction is inclined relative to the cylinder head bottom surface 3 and directed into the intake throat 8. When the intake airflow is injected into the intake throat 8, some airflow is squeezed towards the exhaust valve due to the tumble generating sharp angle 9, thus increasing the airflow to the exhaust valve and decreasing the airflow on the intake valve. The airflow on both sides forms a large-scale tumble movement after entering the cylinder, thus meeting the combustion demand of the gas engine. The tumble effect is shown in the tumble schematic 100 in FIG. 2.

It is noted that, in this solution, the function of the tumble generating sharp angle 9 is to squeeze part of the air flow to the exhaust valve before entering into the intake throat 8. The tumble generating sharp angle 9 which may realize the above functions may be designed into various structural shapes. For example, the edge of one side, facing the center of the intake valve, of the tumble generating sharp angle 9 is designed as an arc, straight, broken, or other curved structure. Preferably, the sharp angle projection 15 in this solution is a crescent-shaped area with the concave side facing the center of the intake valve, as shown in FIG. 6. In this structure, one side edge of the tumble generating sharp angle 9 toward the center of the intake valve is specifically designed as a concave arc, and both ends of the sharp angle projection 15 are connected with the upper circular surface of the valve seat ring 4 at intersection points P1 and P2.

It should be noted that the tumble generating sharp angle 9 specifically includes an upper guiding surface and a lower processing surface, and the junction between the upper guiding surface and the lower processing surface is the edge of the tumble generating sharp angle 9 protruding toward the center of the intake valve, and the lower processing surface is the processing surface formed by removing part of the material of the cylinder head main body 1 by the tumble generating sharp angle processing feature. The processing features of tumble generating sharp angles may specifically adopt casting processing, rotary cutting processing, etc. According to different structures of tumble generating sharp angles 9, the lower processing surface may specifically be designed as a rotary processing surface, multiple planes connected in sequence, or other curved surface structures, etc. Preferably, the lower processing surface in this solution is a rotary processing surface 7 surrounding a processing axis, the processing axis may be designed to be coincided, parallel or relatively inclined with the axis of the valve seat ring 4, the generatrix of the rotary processing surface 7 is a straight line, a broken line or a curve. After removing part of the material of the cylinder head main body 1, the rotary processing surface 7 forms the tumble generating sharp angle 9.

It is noted that, according to different generatrix shapes, the rotary processing surface 7 may be specifically designed into various conical surface structures. Preferably, the rotary processing surface 7 of this solution is a conical processing surface, the processing axis of the conical processing surface coincides with axis of the valve seat ring 4, and the vertex of the conical processing surface is located above the valve seat ring 4, as shown in FIG. 2 and FIG. 3. The specific shape of the tumble generating sharp angle 9 depends on the cone angle of the conical processing surface. The larger the cone angle is, the sharper the tumble generating sharp angle 9 is. Preferably, the cone angle α of the conical processing surface in this solution ranges from 60 degrees to 160 degrees, and within this range, it may be ensured that the tumble generating sharp angle 9 has a sharp enough angle, so as to further enhance the sudden change of flow velocity and the squeezing effect on the intake air flow.

It is noted that the maximum flow port formed by the rotary processing surface 7 in the upper circular surface of the valve seat ring 4 is a theoretical intake flow port 16, that is, the projection of the circular profile formed by the cone bottom of the rotary processing surface 7 after removing the material of the cylinder head main body 1 in the round surface at upper end of valve seat ring 5 along the axial direction of the intake throat 8 forms the theoretical intake flow port 16. When the processing axis of the rotary processing surface 7 coincides with or is parallel to the axis of the valve seat ring 4, the theoretical intake flow port 16 is a circular flow port; when the processing axis of the rotary processing surface 7 and the axis of the valve seat ring 4 are relatively inclined, the theoretical intake flow port 16 is an elliptical flow port. The equivalent diameter of the theoretical intake flow port 16 is D2, and the minimum diameter of the sealing surface of the valve seat ring 4 is D1. In this solution, the relationship between D2 and D1 is as follows: D2=0.85 D1–D1, When D2 is designed to be 85%~100% D1, the circulation capacity and the tumble effect may be balanced, that is, the obvious tumble effect may be achieved while the minimum impact on the circulation capacity is ensured.

Referring to FIG. 6, the total area of the theoretical intake flow port 16 is S3, and the area of the sharp angle projection 15 is S1. Since the tumble generating sharp angle 9 prevents part of the air flow through, the area of the opening at the lower end of the tumble generating duct 21 for the actual airflow (i.e., the actual intake flow port area S2 shown by the shaded part in FIG. 6) is equal to the total area S3 of the theoretical intake flow port 16 minus the area S1 of the sharp angle projection 15, that is, the relationship among S1, S2 and S3 satisfies: S3=S1+S2.

The larger the area of the sharp angle projection 15 is, the more obvious the effect of the tumble generating sharp angle 9 to block the airflow is, thus the greater the degree of squeezing the airflow is, that is, the more obvious the increased airflow speed is, the greater the intensity of the generated tumble flow is. In order to balance the tumble effect with the duct flow capacity, this solution designs the area S1 of the sharp angle projection 15 to be 15% to 50% of the area S3 of the theoretical intake flow port 16, that is, between S1 and S3: S1/S3=0.15~0.5.

Preferably, the connecting line between the middle point of the connecting line between the two ends of the sharp angle projection 14 (as shown in FIGS. 5 and 6, the connecting line between the intersection points P1 and P2) and the center of the intake valve is a sharp angle direction line 13, and the included angle between the connecting line, between intake valve center and exhaust valve center 12, and the sharp angle direction line 13 is a sharp angle direction angle β, as shown in FIG. 4. In this solution, the sharp angle direction angle β ranges from 0 to 45. With this setting, the convex side edge of the tumble generating sharp angle 9 may be arranged towards the adjacent exhaust valve, thus controlling the large-scale tumble motion to fill the whole cylinder as much as possible. The connecting line between intake valve center and exhaust valve center 12 is the connecting line between the intake valve center and the exhaust valve center 11, as shown in FIG. 4.

Preferably, the arc angle θ spanned by the sharp angle projection 15 on the upper end circular surface of the valve seat ring 4 is 90-220 degrees. This feature defines the span size of the tumble generating sharp angle 9 in the intake duct 2.

Preferably, the tumble guide surface 22 is provided with a flowing-down guide surface 23 which is located upstream of the tumble generating sharp angle 9 and is recessed toward the cylinder head bottom surface 3. When the intake airflow passes through the tumble generating duct 21, the flowing-down guide surface 23 causes the airflow to tumble, and after the tumble moving airflow is further squeezed by the tumble generating sharp angle 9, the tumble intensity increases, and finally the tumble effect is generated in the cylinder. Since the recessed flowing-down guide surface 23 may affect the flow capacity, the recessed depth of the flowing-down guide surface 23 here is relatively small.

It is noted that the intersection between the projection of the outer ring of the valve seat ring 4 upward along its own axial direction and the flowing-down guide surface 23, that is, the intersection between the cylindrical surface where the outer ring of the valve seat ring 4 is located and the flowing-down guide surface 23, is the characteristic line of the flowing-down guide surface depression depth. Preferably, in this solution, the minimum distance (distance LD shown in FIG. 2) from the characteristic line of the flowing-down guide surface depression depth to the cylinder head bottom surface 3 is designed to be greater than 9% of the cylinder liner diameter.

It is noted that the intake duct 2 includes a straight duct, a curved transition duct and the tumble generating duct 21 which are sequentially communicated along the intake direction, the curved transition duct is extended from the straight duct to the tumble generating duct 21, In order to ensure that the intake duct 2 has sufficient flow capacity, preferably, in this solution, the maximum distance L from the lower side of the curved transition duct to the cylinder head bottom surface 3 is designed to be more than 0.25 times of the cylinder liner diameter, and the larger the distance L is, the better the flow capacity of the intake duct 2 is, thus ensuring that the flow capacity of the air inlet 2 is not reduced.

Therefore, on the basis of the existing diesel engine, the present application designs the tumble generating duct 21 downstream of the intake duct 2 and the tumble generating sharp angle 9 at the lower end of the tumble generating duct 21, so that the intake air flow may generate a certain intensity of tumble effect required by the gas engine; meanwhile, only the intake duct structure of the cylinder head of the existing diesel engine needs to be modified according to the present application, which greatly reduces the cost of product modification and design, which enables cylinder heads of gas engines and diesel engine cylinder heads to be produced on the same line and improves product feasibility and competitiveness.

In addition, at the end of the compression stroke of the engine, the tumble flow in the cylinder is crushed into small-scale turbulence, which makes the gas generate higher turbulent kinetic energy, thus accelerating the flame propagation speed, meeting the combustion demand of the gas engine and improving the thermal efficiency of the gas engine.

Figure 7:
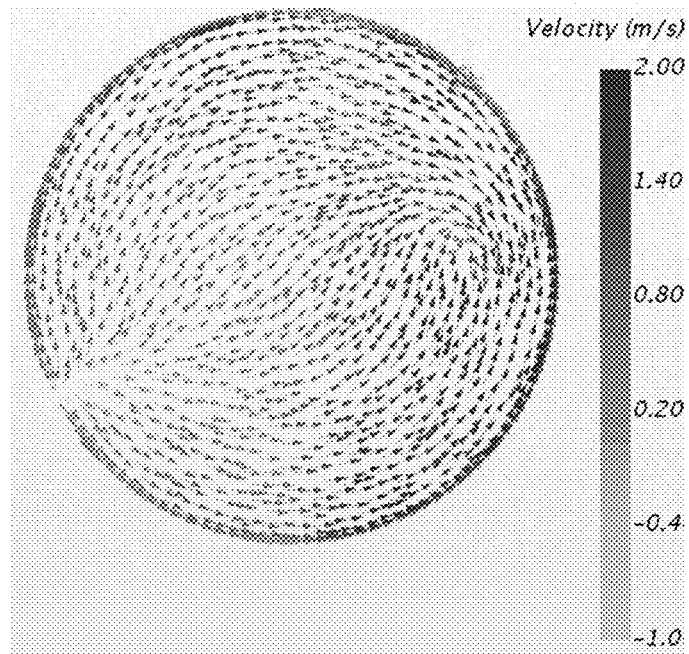
FIG. 7 is an effect diagram of an intake steady-state flow simulation test of a conventional gas engine.
Figure 8:
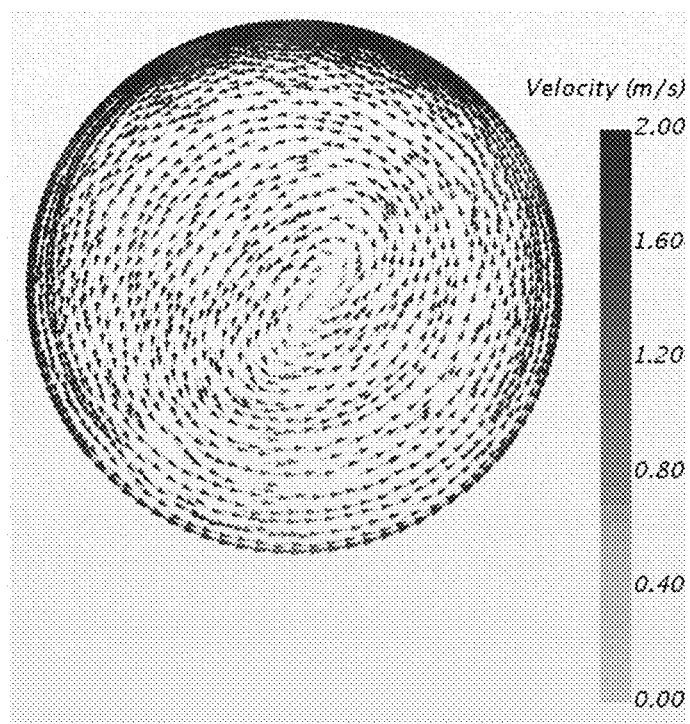
FIG. 8 is an effect diagram of an intake steady-state flow simulation test of a gas engine in the specific embodiment of the present application.

Referring to FIG. 7 and FIG. 8, FIG. 7 is an effect diagram of an intake steady-state flow simulation test of a conventional gas engine; FIG. 8 is an effect diagram of an intake steady-state flow simulation test of a gas engine in a specific embodiment of the present application. The circular areas in FIG. 7 and FIG. 8 represent the cross-sectional areas of experimental observation, which are specifically the circular cross-sectional areas cut by the circular observation window near the cylinder head bottom surface 3 in the longitudinal section of the cylinder, and many small arrows in the circular areas represent the flow form of gas. By comparison, it may be seen that the present application makes the airflow form a very obvious tumble flow characteristic in the cylinder, while the existing solution does not form an effective tumble flow at the same position.

The present application further provides a gas engine including the above cylinder head. The derivation process of the beneficial effects produced by the gas engine is substantially similar to the derivation process of the beneficial effects brought about by the cylinder head described above, so it may not be repeated here.

The above description of the disclosed embodiments enables those skilled in the art to implement or use the present application. Various modifications to the embodiments are apparent to the person skilled in the art, and the general principle herein can be implemented in other embodiments without departing from the spirit or scope of the present application. Therefore, the present application will not be limited to the embodiments described herein, but should be in accordance with the broadest scope consistent with the principle and novel features disclosed herein.

The invention claimed is:

1. A cylinder head, comprising an intake throat and an intake duct, wherein a valve seat ring is provided in an inner ring of the intake throat; a section, close to the intake throat, of the intake duct is a tumble generating duct; and an extending direction of the tumble generating duct is oblique relative to a cylinder head bottom surface, a lower side surface of the tumble generating duct is a tumble guide surface, and a lower end of the tumble guide surface forms a tumble generating sharp angle located above the valve seat ring, and the projection of the tumble generating sharp angle on an upper end circular surface of the valve seat ring along an axial direction of the intake throat is a sharp angle projection, the sharp angle projection is a protruding area protruding from the edge of the upper end circular surface of the valve seat ring to a center of the intake valve in a radial direction, and a width of a middle part of the sharp angle projection is larger than a width of both ends of the sharp angle projection.

2. The cylinder head according to claim 1, wherein the sharp angle projection is a crescent-shaped area with a concave side facing the center of the intake valve.

3. The cylinder head according to claim 1, wherein the tumble generating sharp angle comprises an upper guiding surface and a lower processing surface, and the lower processing surface is a rotary processing surface surrounding a processing axis, the processing axis and the axis of the valve seat ring are coincided, parallel or relatively inclined, and the generatrix of the rotary processing surface is a straight line, a broken line or a curve.

4. The cylinder head according to claim 3, wherein the rotary processing surface is a conical processing surface, the processing axis coincides with the axis of the valve seat ring, and a vertex of the conical processing surface is located above the valve seat ring.

5. The cylinder head according to claim 4, wherein a conical angle of the conical processing surface is 60 degrees-160 degrees.

6. The cylinder head according to claim 3, wherein a maximum flow port formed by the rotary processing surface on the upper end circular surface of the valve seat ring is a theoretical intake flow port, and an equivalent diameter of the theoretical intake flow port is 85%-100% of a minimum diameter of a sealing surface of the valve seat ring.

7. The cylinder head according to claim 6, wherein an area of the sharp angle projection is 15%-50% of an area of the theoretical intake flow port.

8. The cylinder head according to claim 1, wherein a connecting line between a midpoint of the connecting line, between two ends of the sharp angle projection, and the center of the intake valve is a sharp angle direction line, and an included angle between the connecting line between the center of the intake valve and a center of the exhaust valve and the sharp angle direction line is a sharp angle direction angle, which is ranged from 0 to 45 degrees.

9. The cylinder head according to claim 1, wherein an arc angle spanned by the sharp angle projection on the upper end circular surface of the valve seat ring is 90 degrees-220 degrees.

10. The cylinder head according to claim 1, wherein the tumble guide surface is provided with a flowing-down guide surface which is located upstream of the tumble generating sharp angle and is recessed toward the cylinder head bottom surface.

11. The cylinder head according to claim 1, wherein the intake duct comprises a straight duct, a curved transition duct and the tumble generating duct which are sequentially communicated along the intake direction, the curved transition duct is extended from the straight duct to the tumble generating duct, and a maximum distance from a lower side of the curved transition duct to the cylinder head bottom surface is more than 0.25 times the diameter of the cylinder liner.

12. A gas engine, comprising the cylinder head according to claim 1.

* * * * *